(12) United States Patent
Holec et al.

(10) Patent No.: US 7,275,335 B2
(45) Date of Patent: Oct. 2, 2007

(54) WIRELESS TRAM GAUGE ASSEMBLY

(75) Inventors: Henry V. Holec, Mendota Heights, MN (US); Greg W. Parkhurst, Brooklyn Park, MN (US); Timothy M. Gack, Akeley, MN (US); Eric R. Seckerson, Garfield, MN (US); Mike V. Atkinson, Eden Prairie, MN (US)

(73) Assignee: Chassis Liner, Fort Worth, TX (US)

( * ) Notice: Subject to any disclaimer, the term of this patent is extended or adjusted under 35 U.S.C. 154(b) by 91 days.

(21) Appl. No.: 11/206,503

(22) Filed: Aug. 18, 2005

(65) Prior Publication Data

US 2007/0039197 A1 Feb. 22, 2007

(51) Int. Cl.
*G01B 5/00* (2006.01)

(52) U.S. Cl. .............................. 33/784; 33/288; 33/608; 33/203.21

(58) Field of Classification Search .................. 33/288, 33/296, 784, 783, 787, 788, 806, 809, 810, 33/811, 812, 600, 608, 193, 335, 336, 337, 33/533, 542, 552, 792, 793, 794, 795, 365, 33/832, 833, 836
See application file for complete search history.

(56) References Cited

U.S. PATENT DOCUMENTS

| | | | |
|---|---|---|---|
| 4,262,519 A | 4/1981 | Mason | 72/457 |
| 4,577,413 A | 3/1986 | Mason | 33/203.18 |
| 4,640,015 A | 2/1987 | Mason | 33/203.18 |
| 4,912,662 A * | 3/1990 | Butler et al. | 702/154 |
| 4,939,848 A * | 7/1990 | Armstrong | 33/608 |
| RE33,302 E | 8/1990 | Mason | 33/608 |
| 5,507,101 A | 4/1996 | Mason | 33/608 |
| 5,647,139 A | 7/1997 | Richardson | 33/608 |
| 5,694,697 A * | 12/1997 | Curtis | 33/203 |
| 5,829,146 A | 11/1998 | Watson | 33/288 |
| 6,329,953 B1 | 12/2001 | McKivergan | 343/703 |
| 6,347,457 B1 | 2/2002 | Espinoza et al. | 33/288 |
| 6,598,308 B1 | 7/2003 | Johansson et al. | 33/608 |
| 6,604,292 B1 | 8/2003 | Irish et al. | 33/288 |
| 6,769,192 B2 | 8/2004 | Johansson et al. | 33/608 |
| 6,775,639 B1 * | 8/2004 | Mason | 702/152 |

* cited by examiner

*Primary Examiner*—G. Bradley Bennett
*Assistant Examiner*—Amy R. Cohen
(74) *Attorney, Agent, or Firm*—Christopher G. Frank; Larkin Hoffman Daly & Lindgren Ltd.

(57) ABSTRACT

The present invention relates to a digital tram gauge assembly having an extendible elongate tram bar having a first height rod at a first end and a second height rod at a second end. A digital measuring device is positionable about the tram bar and is capable of digitally sensing, displaying and wirelessly transmitting measurement data from the digital tram gauge. The digital measuring device further includes a digital level sensor that functions as a digital level comparator to indicate whether the tram gauge assembly is oriented substantially parallel to a user-defined reference datum plane.

17 Claims, 3 Drawing Sheets

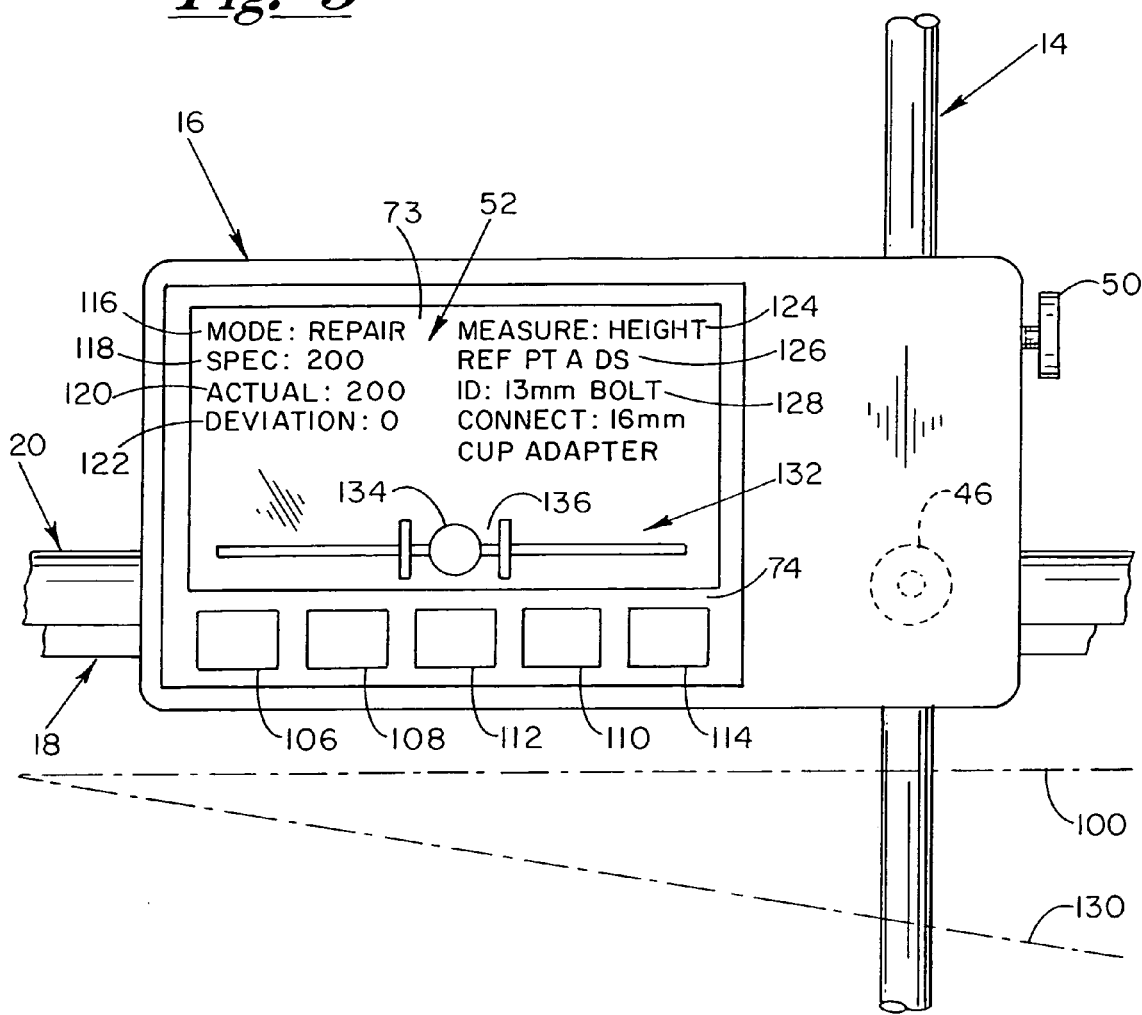

WIRELESS TRAM GAUGE ASSEMBLY

BACKGROUND OF THE INVENTION

1. Field of the Invention

The present invention relates to an apparatus for measuring and assisting in the alignment and repair of damaged or potentially damaged structural members. The present invention has particular application to the structural measurements of damaged and repaired automobiles.

2. Background of the Prior Art

In the manufacture of automobiles, it is common practice to provide specific datum points in the structure of the vehicle during manufacture, for use in checking the dimensional accuracy of the finished product. These datum points can take various forms such as holes in the chassis, male and female threaded members such as bolt heads, nuts or studs, and other formations such as pins, lugs and suspension mounting points.

These datum points may be oriented in vertical or horizontal planes, or at intermediate angles. They also vary significantly from model to model according to various design parameters and practical convenience. In all cases, however, they are accurately positioned in known locations and the design specification of each vehicle normally includes a table of dimensions which correlate the various datum points.

In the case of damaged vehicles, these datum points can be used to define a reference datum plane using datum points from an undamaged section of the vehicle. This datum plane can then be used as a reference for determining the deviation from vehicle specifications of the reference points on the damaged section of the vehicle, or to ensure that a damaged vehicle has been sufficiently repaired with reference to specifications.

Numerous types of known vehicle measurement apparatus purport to provide a means for determining a deviation of a datum point from specification, to facilitate the evaluation and repair of damaged or potentially damaged vehicles.

One such apparatus is discussed in U.S. Pat. No. 6,769, 192 issued on Aug. 3, 2004 to Johansson et al describes an extension ruler having a built in measuring device. The built in measuring device incorporates a tape extending from one end of the extension ruler to the other end, where the tape is wound on a drum spring. A digital display of a measurement is provided by detecting the rotation of the drum via a light source and photo diode. The measuring device further includes a spirit level to allow quick and normalized measuring, such that the spirit level represents an approximation of the datum plane.

One problem with such prior art devices is due to the use of a spirit level. A supposition in the prior art is that the vehicle being measured is oriented parallel to the natural horizontal plane defined by the spirit level. In practice, a vehicle may further, or alternatively, be oriented to have a pitch and/or a roll with respect to the natural horizontal plane indicated by a spirit level. The actual datum plane of the vehicle, therefore, may have a pitch such that the vehicle is longitudinally inclined with respect to the natural horizontal plane. The vehicle may further be oriented to have a roll such that the vehicle is laterally inclined with respect to the natural horizontal plane. For this reason, measurements taken using a spirit level may incorporate errors due to the pitch and/or roll of the reference datum plane with respect to the natural horizontal plane indicated by the spirit level.

It would, therefore, be advantageous to provide a means for ensuring that measurements are made parallel to the reference datum plane of the vehicle so as to increase measurement accuracy and minimize measurement errors with respect to prior art devices.

Another problem with such prior art devices is that a user is required to manually record measurements, for example, into a database. Although the prior art device discussed herein provides a digital display of a measurement, a user must still separately record such measurements in a database or record sheet.

It would, therefore, be advantageous to provide a means for allowing digital recordation of measurements displayed by the device, so as to eliminate the need for manual recordation and data entry.

It would, additionally be advantageous to provide a measurement device that is simple in design and operation as compared to the prior art devices.

It is an object of the present invention to solve these and additional problems of the prior art.

SUMMARY OF THE INVENTION

The present invention provides a digital tram gauge assembly. A first tram bar and second tram bar are slidably engaged and extendible with respect to each other. A first height rod is positioned at a first end of the first tram bar. A digital measuring device is selectively positioned on the second tram bar. The digital measuring device is configured to adjustably receive the first and second tram bars through a lumen that operably extends in a generally horizontal direction. The digital measuring device is further configured to adjustably receive a second height rod in a lumen that operably extends in a vertical direction.

The digital measuring device includes a housing for a microprocessor. The microprocessor is in communication with a number of inputs from peripheral devices connected thereto. A first and second sensor are configured to receive inputs relating to the relative positions of the first and second tram bars, respectively. A third sensor is configured to receive inputs regarding the relative position of the second height rod. A fourth sensor is a digital level sensor for providing a comparative level indicator to the digital measuring device. The digital measuring device further includes a wireless communication means for remotely communicating with a computer.

In use, a number of datum points on a vehicle are used to define a reference datum plane, generally from a number of points located on an undamaged section of a vehicle. The digital level sensor is used to define a pitch and roll of the datum plane when measuring the relative distance and height of such datum points. The digital measurement device is then able to operate as a digital level that indicates, via a display unit on the digital measurement device housing, whether the tram gauge assembly is oriented parallel to the reference datum plane when taking measurements at additional datum points on the vehicle. This insures accurate and reliable measurements for assessing damaged sections of the vehicle and assessing repair work for a vehicle in accordance with vehicle specifications. Such measurements may then be wirelessly transmitted and stored to a remote computer for future use and reference.

These and additional advantages, features and benefits of the present invention are illustrated in more detail with reference to the Figures and Detailed Description of the Invention provided below.

BRIEF DESCRIPTION OF THE DRAWINGS

FIG. 3 is an example of the display in accordance with the invention from FIGS. 1 and 2.

DETAILED DESCRIPTION OF THE INVENTION

The present invention provides a wireless tram gauge assembly 10. An intended use of the present invention is for the measure and repair of damaged vehicles. The present invention may, however, be utilized for any suitable endeavor requiring accurate measurement.

Figure 1:
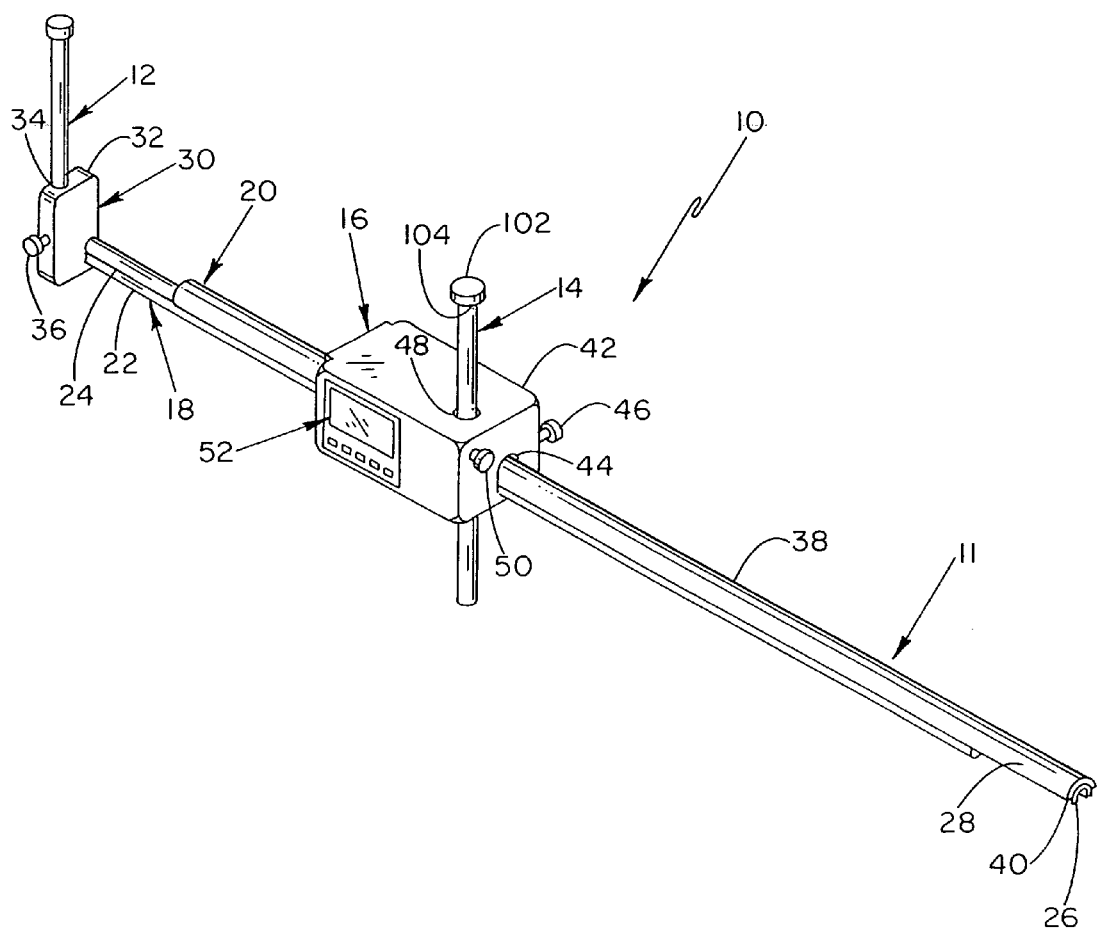
FIG. 1 is a perspective view of an embodiment of the present invention.

FIG. 1 shows a wireless tram gauge assembly 10 in accordance with an embodiment of the present invention. The present invention generally includes an extendable tram bar 11 having height rods 12, 14 at opposing ends thereof. A digital measuring device 16 is mounted to the tram bar 11 and configured to display and record measurements, particularly length and height measurements from a first point to a second point, based upon the positioning of the first and second height rods 12, 14. The digital measuring device 16 additionally provides the features of a digital level comparator and remote wireless data communication. The various components and functions of the present invention shall be described in detail herein with reference to the various figures.

As shown in FIG. 1, the extendable tram bar 11 includes a first tram bar 18 slidably coupled to a second tram bar 20 such that the first tram bar 18 operates in a telescopically extendible relationship to the second tram bar 20.

The first tram bar 18 is an elongate structure having a pair of side walls 22, each of which having a receiving channel 24 for receiving the flange 26 from a corresponding side wall 28 of the second tram bar 20. This cooperating structure forms a slidably coupled relationship between the first tram bar 18 and the second tram bar 20.

A first height rod 12 and corresponding housing 30 are mounted to a first end 32 of the first tram bar 18. The housing 30 defines a receiving channel 34 that is configured to operably receive the first height rod 12 in a top side thereof, such receiving channel 34 extending generally vertically when in an operable orientation. A locking screw 36 provides a mechanism for selectively securing the first height rod 18 with respect to the housing 30 during operation.

The second tram bar 20 has a pair of elongate side walls 28 connected to each other at a top edge by an elongate top panel 38. Each of the side walls 28 has at the bottom edge a flange 26, configured such that the second tram bar 20 defines a downwardly facing channel 40 in an operable orientation.

A digital measuring device 16 and device housing 42 are operably mounted to the second tram bar 20. The housing 42 defines a first receiving channel 44, extending generally horizontally when in an operable orientation. The first receiving channel 44 is configured such that the elongate dimension of the tram gauge assembly 10 extends therethrough, defined by the first tram bar 18 and second tram bar 20 in the present embodiment of the invention.

The digital measuring device housing 42 is selectively positioned and secured about the elongate dimension of the tram gauge assembly 10. As shown, the digital measuring device 16 is positioned about the second tram bar 20 and selectively secured thereto via a locking screw 46 acting as a locking mechanism in a first, operably horizontal, direction. Thus, in operation, the position of the digital measuring device housing 42 will generally remain fixed with respect to the second tram bar 20. The digital measuring device housing 42 and second tram bar 20 may then be slidably extended or retracted with respect to the first tram bar 18. In the case where lesser or greater length is needed, the digital measuring device 16 may be slidably extended or retracted about the second tram bar 20 and fixed in a new position.

The digital measuring device housing 42 further includes a second receiving channel 48, operably extending in a second, vertical direction, perpendicular to the first receiving channel 44. The second receiving channel 48 is configured to receive a second height rod 14 therein. The second height rod 14 may be selectively positioned and adjusted within the second receiving channel 48 and locked by a second, vertical, locking screw 50. The vertical locking screw 50 acts as a vertical locking mechanism, allowing a user to selectively adjust and lock the height of the second height rod 14 with respect to the housing 42.

The digital measuring device 16 functions as an interface unit wherein the housing 42 further includes a display 52 on a side panel, thereof. The display 52 provides an interface for the user to interact and operate the digital measuring device 16 and take measurements with the wireless tram gauge assembly 10.

Figure 2:
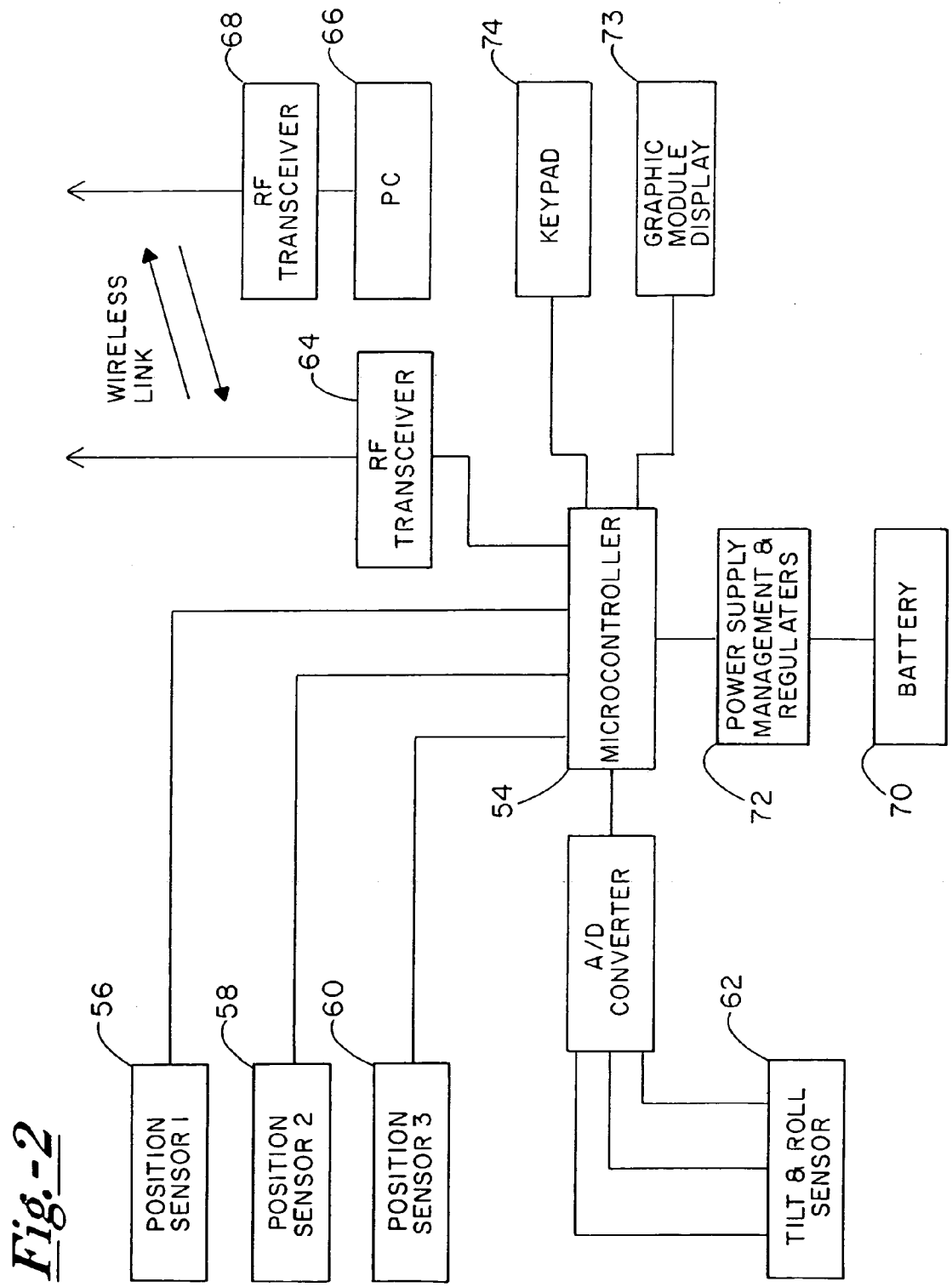
FIG. 2 is a block diagram of an embodiment of the controller in accordance with the invention from FIG. 1.

FIG. 2 provides a block diagram of the various central electronic components housed by the digital measuring device 16, in accordance with an embodiment of the present invention. A microcontroller system 54 is provided for interfacing and controlling the operation of the various components of the digital measuring device 16. A first position sensor 56 is configured to provide input relating to the first tram bar 18. A second position sensor 58 is configured to provide input relating to the second tram bar 20. A third position sensor 60 is configured to provide input relating to the second height rod 14.

The position sensors 56, 58, 60 may, for example, be optical encoders, such as the miniature panel mount optical encoders known as Rotary Pulse Generators (RPG) and digital potentiometers. A preferred such optical encoder is the HRPG series manufactured by Agilent Technologies, located at 395 Page Mill Rd. Palo Alto, Calif., in the United States.

The position sensors 56, 58, 60, generally, engage a corresponding component such as the first tram bar 18, second tram bar 20 or second height rod 14, respectively, such that as the respective component is moved with respect to the sensor, an input is received by the position sensor that can be used to generate a measurement, or other such input relating to the relative position of a sensor and corresponding component with which it is operably engaged.

The digital measuring device 16 further includes a level sensor 62 capable of sensing the pitch and roll of the digital measuring device 16, and the tram gauge assembly 10 when mounted thereto. The level sensor 62 may, for example, be a dual axis inclinometer, or other such tilt and roll electrolytic fluid sensors. A preferred such digital level sensor is the Spectrotilt II MICRO-50—Dual Axis Digital Inclinometer manufactured by Spectron Systems Technology, Inc. located at 595 Old Willets Path, Hauppauge, N.Y., located in the United States.

The digital level sensor 62, generally, is able to sense, as an input, the pitch and roll of the digital measuring device 16 with respect to a horizontal plane and provide a digital output to the digital measuring device 16 relating thereto.

A remote, wireless communication transceiver 64 is also provided in the present invention. Such transceiver may be any wireless communication means, generally a radio frequency transceiver. In a preferred embodiment, such wireless communication means utilizes Bluetooth™ technology available from a number of licensed sources such as FREE2MOVE AB of Pilefeltsgatan 77 S-302 50, Halmstad located in the country of Sweden. Such wireless communication capability allows the digital measuring device 16 to wirelessly transmit and receive data with a remote computer 66 having corresponding wireless communication means 68.

The digital measuring device further includes a power supply source 70, such as a battery, and a power supply management and regulator 72, as is commonly employed in the art.

The digital measuring device 16 operates as an interface unit via the display screen 73 and keypad 74 of the display 52 powered thereby. Thus, the inputs from the first and second sensors 56, 58 can be displayed on the display screen 73 as a length measurement, for example, relating to the distance from the first height rod 12 to the second height rod 14. The inputs from the third sensor 60 can be displayed as a height measurement of the second height rod 14 with respect to a reference height. The inputs from the digital level sensor 62 can be displayed as a digital level indicator or comparator, for example. Such functions of the present invention are discussed in more detail with reference to FIG. 3.

One use for which the present invention is particularly suitable is in the repair of damaged automobiles. Such repair involves, firstly, setting up a datum plane 100, which is an imaginary reference plane extending parallel to the vehicle from which all other measurements are referenced. The datum plane 100 is defined by taking measurements from a number of undamaged datum points on the automobile, such datum points being based upon a manufacturer's vehicle specification. Once the datum plane 100 is defined, measurements may be taken of selected damaged reference points on the vehicle to determine the deviation of the damaged reference points from vehicle specifications.

The damaged sections of the vehicle may then be repaired, and such repairs may be verified by again measuring such reference points with respect to vehicle specifications. Whereas such general procedure for setting up a datum plane and taking measurements of various datum points on a vehicle is commonly known in the art, the improvements relating to the method and apparatus in accordance with the present invention shall now be discussed.

Setting up the tram gauge assembly 10 for operation includes setting up the corresponding remote computer 66 with which the tram gauge assembly 10 is capable of wirelessly communicating.

The remote computer 66 may include a database of vehicle specifications. A user selects, from the computer interface, the specifications corresponding to the make, model, year and type of vehicle from which measurements are to be taken. The vehicle specification includes the measurements of a number of datum points on the vehicle. Once the vehicle specifications have been selected, the user may begin setting up a reference datum plane 100. A user selects a number of datum points (typically four) from the specification that correspond to undamaged sections of the vehicle to be measured. These datum points form the basis for setting up the datum plane 100.

The remote computer 66 may also indicate a number of adapters to be placed at the various datum points on the vehicle. Such adapters are generally magnetic adapters and may vary in configuration in accordance with the corresponding datum point so as to provide a receiving portion for the top section of the first height rod 12 and/or second height rod 14 to be connected thereto.

The first height rod 12 and second height rod 14 include, for example, a magnetic cone 102 positioned at the top section 104 for magnetically connecting to a corresponding adapter positioned at a datum point. Such appropriate adapters are used at the various reference and measurements datum points on the vehicle for accurately engaging the first and second height rods of the tram gauge assembly.

A number of interchangeable height rods of different length and other relevant characteristics may be used. The remote computer 66 may provide an indication of a preselected one of a plurality of first height rods 12 and may provide an indication of a preselected one of a plurality of second height rods 14 and/or extensions in accordance with the datum points selected.

It may be necessary to zero the digital measurement device 16 prior to use. This is done by moving the selectively positioned digital measuring device 16 toward the first height rod assembly 30 until the digital measuring device 16 is adjacent thereto. The second height rod 14 is then adjusted to a bottom position with respect to the digital measuring device 16, wherein, for example, the magnetic cone 102 of the second height rod 14 is in proximate contact with the top of the housing 42 of the digital measuring device 16.

As shown in FIG. 3 the display screen 52 allows the digital measurement device 16 to act as an interface unit for collecting measurements and wirelessly communicating such measurements and deviations of such measurements from a vehicle specification to the remote computer 66.

The display 52 of the digital measurement device 16 provides a display screen 73 and a keypad 74. The keypad 74 may include a number of functional keys, such a power button 106, a pair of scroll buttons 108, 110 for scrolling through different measuring points on a vehicle, a side scroll button 112 for scrolling through different measurement types such as height, length, width and diagonal measurements for a particular point on a vehicle, and an enter button 114 for submitting and transmitting the corresponding data to and from the remote computer 66.

The display screen 73 may include a mode indicator 116. There may be multiple measurement modes from which to select, such as "Datum" mode wherein the datum plane is to be defined, "Damaged" mode where measurements are taken and recorded for the damaged reference points on the vehicle for comparison to the vehicle specifications, and "Repaired" mode where measurements are taken and recorded for comparison of the repaired dimensions to the vehicle specifications.

In setting up the datum plane 100, the first height rod 12 is positioned within the adapter of the first datum point. The second height rod 14 is adjusted to a predetermined height, such predetermined height relating to the second datum point. The tram bar 11 is then extended such that the second height rod 14 is received within the adapter positioned at the second datum point. The display screen 73 may show the specification dimension 118, the actual dimension 120 and the deviation of the datum point measurement from specification 122. The display screen 72 may additionally include an indicator of the type of measurement 124, a description of the datum point and the type of adapter used at the location 128. The measurement of the datum point is then recorded by selecting the enter key 114, which causes such data to be remotely communicated to and recorded by the computer 66.

Generally, once the height of a datum point is recorded first. The side scroll button 112 can then be selected to show and record the corresponding distance measurement of the datum point.

Such process of measuring the height and distance of the various reference datum points with respect to each other may be performed as necessary to properly define a reference datum plane, such as is commonly known in the art.

As each measurement is taken to define the reference datum plane, the comparative level sensor 62 incorporates pitch and roll data for the various measurements of the datum points. When setting up the datum plane 100, the comparative level sensor 62 will send pitch and roll data to the remote computer 66 which is then used for later reference. Such pitch and roll data will define the pitch and roll of the datum plane 100 with respect to a horizontal plane 130, such as could be referenced by a traditional spirit level.

For example, a longitudinal direction of the vehicle may have a pitch. Such pitch is sensed by the comparative level sensor 62 generally based upon the corresponding pitch of the tram gauge assembly 10 as the height measurements of the datum points are taken in the longitudinal direction. Likewise, a lateral direction of the vehicle may have a roll. Such roll may be sensed by the comparative level sensor 62 based upon the incline of the tram gauge assembly 10 as the height measurement of datum points are taken in the lateral direction. A diagonal measurement, extending both longitudinally and laterally may have both a pitch and a roll as sensed by the comparative level sensor 62 when taking such measurements. In summary, when the points comprising the reference datum plane are defined with respect to each other, the pitch and roll of the datum plane 100 is defined therewith.

The operation for measuring to reference points, either of a damaged vehicle or a repaired vehicle, is similar to that of the operation for setting up the datum plane 100. The display, however, includes a digital level indicator 132 which functions as a digital level comparator. The digital level indicator 132 visually indicates the relative incline of the tram gauge assembly 10 with respect to the datum plane 100, to ensure that all reference point measurements are made with reference to the pitch and/or roll of the reference datum plane 100.

FIG. 3 provides a further illustration of the operation of the digital level sensor 62 in combination with the digital level indicator 132. A horizontal plane 130 is shown in relation to the reference datum plane 100, wherein the reference datum plane 100 has a pitch and roll with respect to the horizontal plane 130.

The comparative level sensor 62 cooperates, via the display 52, to indicate that the tram gauge assembly 10 is level only when the elongate dimension of the tram gauge assembly 10 substantially matches the pitch and roll of the datum plane 100. This digital level indicator 132 element ensures that all measurements are taken with reference to the datum plane 100, to ensure measurement accuracy and reliability. It is further understood that in the event that the pitch and/or roll of the datum plane 100 is parallel to that of the horizontal plane 130, such datum plane 100 is still said to have a pitch and roll, such pitch and roll simply being of negligible magnitude.

The digital level indicator 132 is displayed as a digital character 134, such as a dot, that moves about opposing sides of a visually defined level range position 136 in accordance with the relative incline of the tram gauge assembly 10 with respect to the datum plane 100. Any suitable indicating means may be used in accordance with the present invention to provide a user with an indication that the tram gauge 10 extends substantially parallel to the datum plane 100. As shown, such indication is provided when the digital character 134 is substantially positioned within the level range position 136.

In use, the first height rod 12 of the tram gauge assembly is received by a first adapter at a first datum point whereas the tram bar 11 is extended such that the second height rod 16 is received by a second adapter at a second datum point. The elongate dimension of the tram gauge assembly 10 as defined by the tram bar 11 is adjusted by slidably positioning the second height rod 14 with respect to the digital measuring device 16 such that the digital level indicator 132 indicates that the tram gauge assembly 10 is level with respect to the datum plane 100. Once the digital tram gauge assembly is properly oriented, the height and length measurements may be taken and recorded in accordance with the use of the digital measuring device 16.

The present invention, as described herein, is illustrative of the present invention and is not in any way intended to be limiting as to the scope and spirit of the various objectives, features and advantages provided by the present invention.

What is claimed is:

1. A tram gauge assembly comprising:
   a) a first tram bar having a first height rod positioned thereon;
   b) a second tram bar slidably connected to said first tram bar;
   c) a housing for an interface unit selectively positionable about said second tram bar;
   d) a second height rod slidably receivable by said housing of said interface unit, said interface unit comprising:
      i. a microcontroller;
      ii. a first sensor and a second sensor for providing input to said microcontroller relating to a distance between said first height rod and said second height rod;
      iii. a third sensor for providing input to said microcontroller relating to a height of said second height rod;
      iv. a fourth sensor for providing input to said microcontroller relating to an incline of said tram gauge assembly;
      v. a digital display capable of providing an output from said microcontroller relating to the incline of said tram gauge assembly relative to a user defined reference plane.

2. The tram gauge assembly in accordance with claim 1 wherein said interface unit further comprises a remote wireless communication means.

3. The tram gauge assembly in accordance with claim 2 wherein said interface unit is capable of displaying and wirelessly transmitting measurements.

4. The tram gauge assembly in accordance with claim 3 wherein said interface unit provides an analog level indicator.

5. The tram gauge assembly in accordance with claim 3 wherein said interface unit provides a digital level indicator.

6. The tram gauge assembly in accordance with claim 5 wherein one of said measurements is a length measurement relating to a distance between said first height rod and said second height rod in a plane parallel to the datum plane.

7. The tram gauge assembly in accordance with claim 6 wherein another of said measurements is a height measurement relating to a relative height of said second height rod.

8. The tram gauge assembly in accordance with claim 7 wherein said length measurement and said height measurement are displayed as a deviation from a corresponding specification.

9. The tram gauge assembly in accordance with claim 8 wherein said remote wireless communication means allows said measurements to be communicated to a remote data collection and storage unit.

10. A method of measuring points on a vehicle using a digital tram gauge assembly, said method comprising the steps of:
 a) defining a user defined reference datum plane having a pitch and roll;
 b) positioning a first height rod of said digital tram gauge assembly at a first point on said vehicle;
 c) positioning a second height rod of said digital tram gauge assembly at a second point on said vehicle by extending said digital tram gauge assembly thereto;
 d) adjusting said second height rod in accordance with a digital display screen indicator such that said digital tram gauge assembly extends from said first point to said second point in a substantially parallel relationship to said user defined reference datum plane.

11. The method in accordance with claim 10 further comprising the step of wireless transmitting a data measurement from said digital tram gauge assembly to a remote computer.

12. A digital measuring device for measuring a distance between to points on a vehicle relative to a user defined reference plane, said digital measuring device comprising:
 a) a first portion of a tram gauge assembly having a first height rod positionable at a first predetermined datum point on the vehicle;
 b) a second portion of a tram gauge assembly slidably extendible with respect to said first portion of said tram gauge assembly and having a second height rod selectively adjustable with respect to said tram gauge assembly and positionable at a second predetermined datum point on the vehicle;
 c) a microcontroller system coupled to said first portion and said second portion and having a display system defining a distance between said first height rod and said second height rod and a pitch and roll of said tram gauge assembly relative to a user defined reference plane.

13. The digital measuring device from claim 12 further comprising a first sensor coupled to said microcontroller system and disposed to sense a relative position of said first portion with respect to said second portion.

14. The digital measuring device from claim 12 further comprising a second sensor coupled to said microcontroller system and disposed to sense a height of said first height rod.

15. The digital measuring device from claim 12 further comprising a third sensor coupled to said microcontroller system and disposed to sense a pitch and roll of said digital measuring device relative to the user defined reference plane.

16. The digital measuring device from claim 15 wherein said third sensor is an inclinometer.

17. The digital measuring device from claim 16 further comprising a wireless communication device coupled to said microcontroller system.

\* \* \* \* \*